United States Patent
Jiang et al.

(10) Patent No.: US 11,048,824 B2
(45) Date of Patent: Jun. 29, 2021

(54) METHOD FOR IMPROVING SECURITY OF TRUSTED APPLICATION

(71) Applicant: AMLOGIC (SHANGHAI) CO., LTD., Shanghai (CN)

(72) Inventors: Peifu Jiang, Shanghai (CN); Pengguang Zhu, Shanghai (CN); Qi Cao, Shanghai (CN); Yong Wan, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 379 days.

(21) Appl. No.: 16/325,502

(22) PCT Filed: Sep. 27, 2018

(86) PCT No.: PCT/CN2018/108106
§ 371 (c)(1),
(2) Date: Feb. 14, 2019

(87) PCT Pub. No.: WO2019/144640
PCT Pub. Date: Aug. 1, 2019

(65) Prior Publication Data
US 2020/0050798 A1 Feb. 13, 2020

(30) Foreign Application Priority Data

Jan. 23, 2018 (CN) .......................... 201810064595.5

(51) Int. Cl.
*H04L 9/32* (2006.01)
*G06F 21/64* (2013.01)
(Continued)

(52) U.S. Cl.
CPC .............. *G06F 21/64* (2013.01); *G06F 21/51* (2013.01); *G06F 21/602* (2013.01); *H04L 9/3247* (2013.01); *H04L 9/3263* (2013.01)

(58) Field of Classification Search
CPC .......... G06F 21/64; G06F 21/51; G06F 21/52; G06F 21/602; G06F 21/45; G06F 21/56;
(Continued)

(56) References Cited

U.S. PATENT DOCUMENTS

| | | | |
|---|---|---|---|
| 2005/0235154 A1* | 10/2005 | Serret-Avila | G06F 21/64 713/176 |
| 2018/0091314 A1* | 3/2018 | Li | H04L 9/30 |
| 2018/0254898 A1* | 9/2018 | Sprague | H04L 9/3271 |

FOREIGN PATENT DOCUMENTS

| | | |
|---|---|---|
| CN | 104993932 A | 10/2015 |
| CN | 106936774 A | 7/2017 |

(Continued)

*Primary Examiner* — Olugbenga O Idowu
(74) *Attorney, Agent, or Firm* — Withrow & Terranova, PLLC (57) ABSTRACT

A method for improving the security of a trusted application comprises: signing the trusted application in a hierarchical signature mode by the upper computer to generate a signature file package about the trusted application, and saving the signature file package in a main operation system; obtaining the signature file package and loading the signature file package to the second operation environment by the security execution system; parsing the signature file package by the security execution system to obtain a parsed result; and performing hierarchical verification on the parsed result by the security execution system, and if the hierarchical verification is passed, it will indicate that the trusted application is in a security state, otherwise, it is in a non-security state. The defects of lack of a security authentication mode for the trusted application and relatively low security due to mere adoption of a simple digital signature mechanism are overcome.

9 Claims, 3 Drawing Sheets

(51) Int. Cl.
*G06F 21/51* (2013.01)
*G06F 21/60* (2013.01)

(58) Field of Classification Search
CPC .............. H04L 9/3247; H04L 9/3263; H04L 2209/603; H04L 9/3268; H04L 63/08; H04L 2209/38
See application file for complete search history.

(56) References Cited

FOREIGN PATENT DOCUMENTS

CN 107315959 A 11/2017
WO 2017208064 A1 12/2017

* cited by examiner

METHOD FOR IMPROVING SECURITY OF TRUSTED APPLICATION

This application is a 35 U.S.C. § 371 national phase filing of International Application No. PCT/CN2018/108106, filed Sep. 27, 2018, the entire contents of which is incorporated herein by reference, and which claims priority to and the benefit of Chinese Patent Application No. 201810064595.5 filed Jan. 23, 2018.

BACKGROUND OF THE INVENTION

1. Field of the Invention

The invention relates to the field of communication technologies, and more particularly, to a method for improving the security of a trusted application.

2. Description of the Related Art

The development of network technology and the popularity of intelligent devices (e.g., home multimedia and smart phones) have affected us in many ways. For example, online shopping, payment of household water and electricity fees, and purchasing and playing of audio and video works can be done over the intelligent devices, bringing such a new consumption pattern and shopping mode to customers, and affecting people's daily life with each passing day.

However, security issues are of great importance in such a new consumption pattern and shopping mode. In mobile devices, such as home multimedia devices, mobile phones and tablets, ARM's TrustZone technology is commonly used for building a Trusted Execution Environment (TEE), allowing online payment, and DRM playback to be executed in TEE as trusted applications, and thus, security may be enhanced further.

Security issues found in the trusted applications of the existing intelligent devices are as follows:

1. The trusted applications do not have a signature verification mechanism. For such applications, crackers can replace the original trusted application by directly tampering with the code segment of the application, and obtain the execution permission of the application after entering the TEE system, thereby accessing the security resources, intercepting the security data, and destroying the security of the entire TEE system.

2. The trusted applications use a simple digital signature mechanism, such applications carry digital signatures. However, since all trusted applications use the same key signature verification, once the key is intercepted by the illegal, the illegal can use this key to mimic the digital signatures of all the trusted applications in the system, making the entire TEE system untrusted.

SUMMARY OF THE INVENTION

In order to solve the problem of security issues found in the trusted application in the prior art, the present invention provides a method for improving the security of a trusted application by using a multi-layer signature and corresponding multi-layer verification.

The specific technical solution indicates as follows:

A method for improving the security of a trusted application, the method is applied to an intelligent device, wherein the intelligent device provides a main operation system and a security execution system;

wherein an upper computer connected to the intelligent device is provided;

wherein the main operation system provides a first operation environment, and the security execution system provides a second operation environment;

wherein a client application is provided, and the client application runs in the first operation environment;

wherein a trusted application is provided, and the trusted application runs in the second operation environment;

wherein the method comprises steps of:

Step S1, signing the trusted application in a hierarchical signature mode by the upper computer to generate a signature file package about the trusted application, and saving the signature file package in the main operation system;

Step S2, obtaining the signature file package from the main operation system and loading the signature file package to the second operation environment by the security execution system;

Step S3, parsing the signature file package by the security execution system to obtain a parsed result; and Step S4, performing hierarchical verification on the parsed result by the security execution system, and if the hierarchical verification is passed, it will indicate that the trusted application is in a security state, otherwise, it will indicate that the trusted application is in a non-security state.

Preferably, each trusted application comprises a unique identification code;

wherein a first key pair is provided, the first key pair comprises a first private key and a first public key corresponding to the first private key;

wherein a second key pair is provided, the second key pair comprises a second private key and a second public key corresponding to the second private key;

wherein the process of forming the signature file package about the trusted application in the hierarchical signature mode comprises steps of:

Step A1, signing the second public key and the identification code of the trusted application via the first key pair to generate a first signature file;

Step A2, encrypting the trusted application by using a preset encryption algorithm to obtain a first encrypted value;

Step A3, signing the first encrypted value via the second key pair to generate a second signature file; and Step A4, packaging the second public key, the first signature file, the trusted application, the first encrypted value, and the second signature file into the signature file package.

Preferably, the encryption algorithm is a hash algorithm, and the first encrypted value is a hash value.

Preferably, the identification code is the UUID (Universally Unique Identifier, it is a standard for the software construction and a part of Open Software Foundation in the field of Distributed Computing environment. Adoption of UUIDs is for making all the elements in the distributed system have a unique identification information) of the trusted application.

Preferably, a public key encryption algorithm is provided, and the first public key and the first private key in the first key pair are obtained by using the public key encryption algorithm, and/or the second public key and the second private key in the second key pair are obtained by using the public key encryption algorithm.

Preferably, the main operation system is a LINUX system or an Android system, and the first operation environment is an operation environment provided by the LINUX system or the Android system.

Preferably, the security execution system is a security operation system, and the second operation environment is an operation environment provided by the security operation system Preferably, the main operation system provides a storage module, and the storage module is configured to save the signature file package and installation files of the client application;

wherein the security execution system provides a secure storage module in which the first public key is saved.

Preferably, the process of loading the signature file package to the second operation environment comprises steps of:

Step B1, transmitting a request for triggering the trusted application to the security execution system by the client application;

Step B2, loading the trusted application and the signature file package to the second operation environment according to the request by the security execution system.

Preferably, the parsed result obtained by the security execution system parsing the signature file package comprises:

the second public key, the first signature file, the trusted application, the first encrypted value and the second signature file;

wherein the process of performing verification on the parsed result in a hierarchical verification mode by the security execution system comprises steps of:

Step C1, the security execution system verifying the first signature file by calling the first public key saved in the secure storage module to obtain a first verification result, and determining whether the verification is successful according to the first verification result, and if the verification is unsuccessful, return a verification error message and exit, it will indicate that the trusted application is in a non-security state;

Step C2, performing verification on the second signature file via the second public key to obtain a second verification result, and determining whether the verification is successful according to the second verification result;

if the verification is unsuccessful, return a verification error message and exit, it will indicate that the trusted application is in a non-security state; and Step C3, encrypting the trusted application by using the preset encryption algorithm to obtain a second encrypted value, and comparing the second encrypted value with the first encrypted value to determine whether the first encrypted value is equal to the second encrypted value, and if the result shows "NO", return a verification error message and exit, it will indicate that the trusted application is in a non-security state; and if the result shows "YES", it will indicate that the trusted application is in a security state.

The technical solution has the following beneficial effects: by performing a multi-layer signature and a multi-layer verification on the trusted application, the security of the trusted application is effectively improved, and the defects of lack of a security authentication mode for the trusted application and relatively low security due to mere adoption of a simple digital signature mechanism in the prior art are overcome.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

The technical solution disclosed in the invention comprises a method for improving the security of a trusted application.

Figure 1:
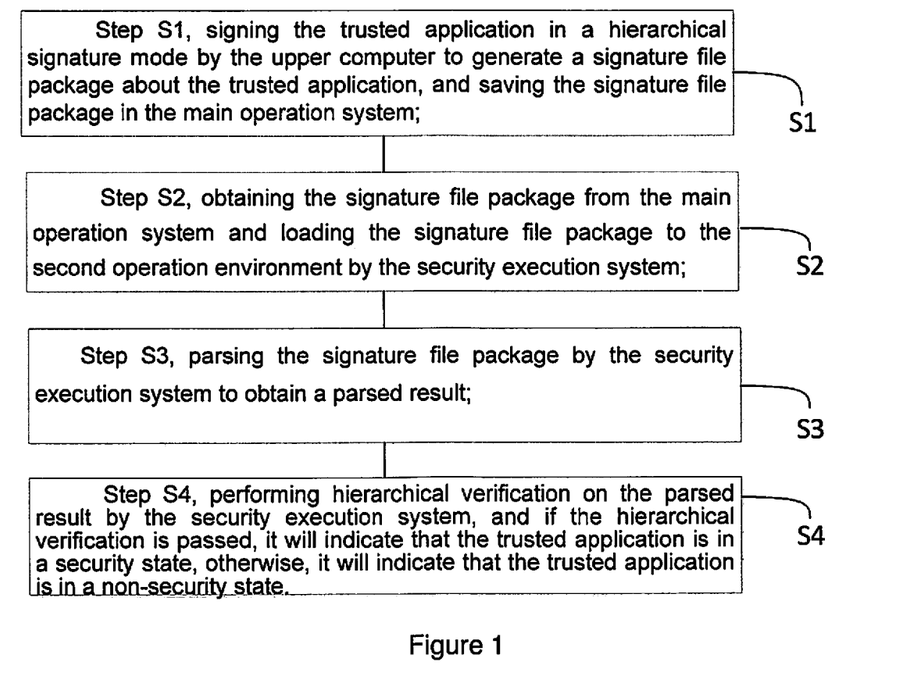
FIG. 1 is a flowchart of a method for improving the security of a trusted application according to an embodiment of the present invention.

A method for improving the security of a trusted application, the method is applied to an intelligent device, wherein the intelligent device provides a main operation system and a security execution system;

wherein an upper computer connected to the intelligent device is provided;

wherein the main operation system provides a first operation environment, and the security execution system provides a second operation environment;

wherein a client application is provided, and the client application runs in the first operation environment;

wherein a trusted application is provided, and the trusted application runs in the second operation environment;

as shown in FIG. 1, the method comprises steps of:

Step S1, signing the trusted application in a hierarchical signature mode by the upper computer to generate a signature file package about the trusted application, and saving the signature file package in the main operation system;

Step S2, obtaining the signature file package from the main operation system and loading the signature file package to the second operation environment by the security execution system;

Step S3, parsing the signature file package by the security execution system to obtain a parsed result; and Step S4, performing hierarchical verification on the parsed result by the security execution system, and if the hierarchical verification is passed, it will indicate that the trusted application is in a security state, otherwise, it will indicate that the trusted application is in a non-security state.

In the prior art, the trusted application lacks a security authentication mechanism. Therefore, the application code of the trusted application which is obtained by the intelligent device is tampered, and obtaining the execution permission of the application after the tampered trusted application entering the TEE system, thereby accessing the security resources, intercepting the security data, and destroying the security of the entire TEE system.

The trusted applications use a simple digital signature mechanism, such applications carry digital signatures. However, since all trusted applications use the same key signature verification, once the key is intercepted by the illegal, the illegal can use this key to access the digital signatures of all the trusted applications in the system, making the entire TEE system untrusted.

In this invention, first of all, the upper computer performs multi-layer signature on a trusted application in a hierarchical signature mode to generate a signature file package about the trusted application, and saving the signature file package in a main operation system; after the intelligent device is started, the security execution system obtains the loaded signature file package and perform verification on the signature file in a multi-layer verification mode to obtain a verification result; and determining whether the trusted application is in a security state according to the verification result, and if the trusted application is in a security state, the trusted application will be allowed to run;

otherwise, the trusted application will be at the risk of being tampered, thus, the trusted application will not be allowed to run. However, adoption of the above-mentioned multi-layer signature and verification may effectively ensure the security of the trusted application.

Figure 2:
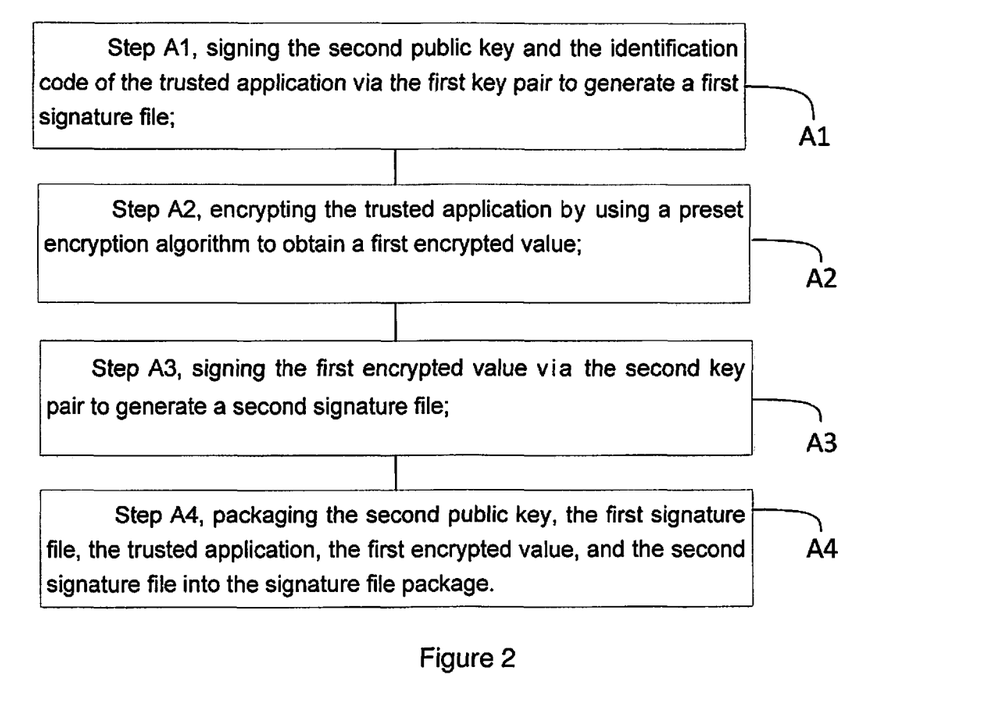
FIG. 2 is a flowchart of an embodiment of a process of forming a signature file package of a trusted application in a method for improving the security of a trusted application according to an embodiment of the present invention.

In a preferred embodiment, each trusted application comprises a unique identification code;

wherein a first key pair is provided, the first key pair comprises a first private key and a first public key corresponding to the first private key;

wherein a second key pair is provided, the second key pair comprises a second private key and a second public key corresponding to the second private key;

as shown in FIG. 2, the process of forming the signature file package about the trusted application in the hierarchical signature mode comprises steps of:

Step A1, signing the second public key and the identification code of the trusted application via the first key pair to generate a first signature file;

Step A2, encrypting the trusted application by using a preset encryption algorithm to obtain a first encrypted value;

Step A3, signing the first encrypted value via the second key pair to generate a second signature file; and Step A4, packaging the second public key, the first signature file, the trusted application, the first encrypted value, and the second signature file into the signature file package.

In the above-mentioned technical solution, in the process of performing signature, that is, in the encryption process, the first layer signature is performed firstly by using the first private key to form a first signature file, which comprises the second public key and the identification code of the trusted application;

the trusted application is then encrypted by using an encryption algorithm to obtain a first encrypted value;

afterwards, the second layer signature is performed by using the second private key to form a second signature file, which comprises the first encrypted value;

and finally, the signature file package comprising the second public key, the first signature file, the trusted application, the first encrypted value, and the second signature file is formed.

In a preferred embodiment, the encryption algorithm is a hash algorithm, and the first encrypted value is a hash value.

In the above-mentioned technical solution, the hash value calculated by the encryption algorithm preferably has 245 bits.

In a preferred embodiment, the identification code is the UUID of the trusted application.

In the above-mentioned technical solution, a plurality of trusted applications can be signed and verified simultaneously in the signature and verification process, and the UUID code of each trusted application is bound to the second key pair to ensure that each application key has an independent and unique second key pair. Thanks to such a technical solution, the problem of relatively low security of the trusted application arising from the application key leakage due to the use of the uniform application key for each of the plurality of trusted applications is overcome.

In a preferred embodiment, a public key encryption algorithm is provided, and the first public key and the first private key in the first key pair are obtained by using the public key encryption algorithm.

In a preferred embodiment, the second public key and the second private key in the second key pair are obtained by using the public key encryption algorithm.

In a preferred embodiment, the main operation system provides a storage module, and the storage module is configured to save the signature file package and installation files of the client application;

wherein the security execution system provides a secure storage module in which the first public key is saved.

In the above-mentioned technical solution, it should be noted that the first key pair is a root key pair, and the second key pair is a TA key pair. Two-level signature is performed by using the root key and the TA key, such that a publisher of a security system is allowed to exclusively hold the root key, and different publishers of the trusted applications each holds respective TA key, thus, the security risk of centralized management of the keys may be reduced.

In a preferred embodiment, the main operation system is a LINUX system or an Android system, and the first operation environment is an operation environment provided by the LINUX system or the Android system.

In a preferred embodiment, the security execution system is a security operation system, and the second operation environment is an operation environment provided by the security operation system.

In a preferred embodiment, the main operation system provides a storage module, and the storage module is configured to save the signature file package and installation files of the client application;

wherein the security execution system provides a secure storage module in which the first public key is saved.

Figure 3:
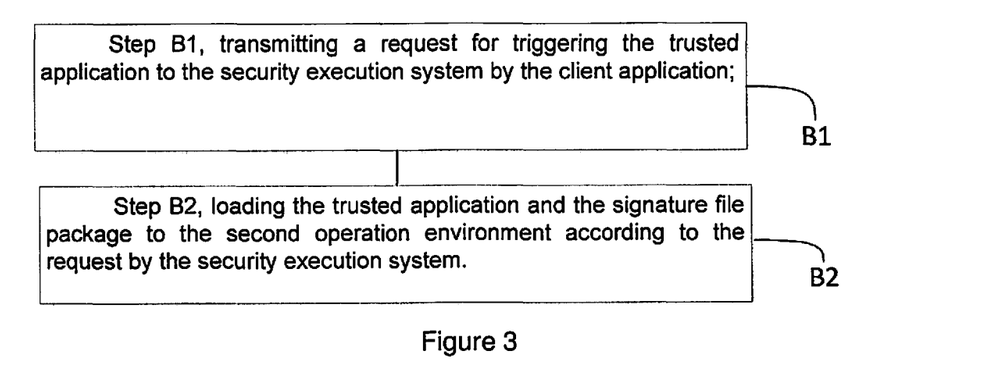
FIG. 3 is a flowchart of an embodiment of a process of loading a signature file package to a second operation environment in a method for improving the security of a trusted application according to an embodiment of the present invention.

In a preferred embodiment, as shown in FIG. 3, the process of loading the signature file package to the second operation environment comprises steps of:

Step B1, transmitting a request for triggering the trusted application to the security execution system by the client application;

Step B2, loading the trusted application and the signature file package to the second operation environment according to the request by the security execution system.

Figure 4:
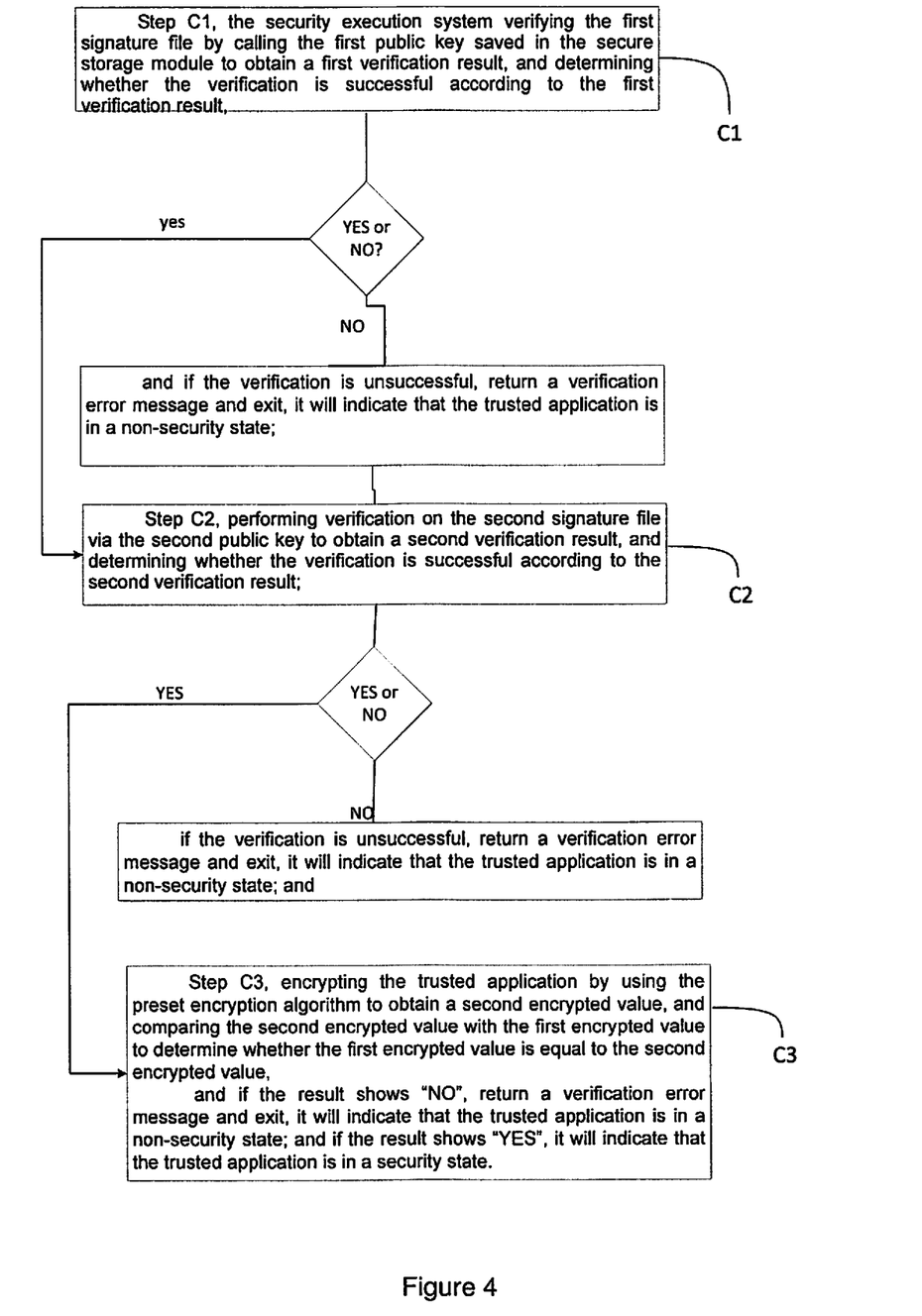
FIG. 4 is a flowchart of an embodiment of a process of performing verification on a parsed result in a method for improving the security of a trusted application according to an embodiment of the present invention.

In a preferred embodiment, the parsed result obtained by the security execution system parsing the signature file package comprises:

the second public key, the first signature file, the trusted application, the first encrypted value and the second signature file;

as shown in FIG. 4, the process of performing verification on the parsed result in a hierarchical verification mode by the security execution system comprises steps of:

Step C1, the security execution system verifying the first signature file by calling the first public key saved in the secure storage module to obtain a first verification result, and determining whether the verification is successful according to the first verification result, and if the verification is unsuccessful, return a verification error message and exit, it will indicate that the trusted application is in a non-security state;

It should be noted that the formed verification result has two statuses: 1. contents contained in the first signature file can be unpackaged by performing verification on the first signature file via the first public key; 2. contents contained in the first signature file cannot be unpackaged by performing verification on the first signature file via the first public key, then verification error message is formed;

Step C2, performing verification on the second signature file via the second public key to obtain a second verification result, and determining whether the verification is successful according to the second verification result, and if the verification is unsuccessful, return a verification error message and exit, it will indicate that the trusted application is in a non-security state;

It should be noted that the formed verification result has two statuses: 1. contents contained in the second signature file can be unpackaged by performing verification on the second signature file via the second public key; 2. contents contained in the second signature file cannot be unpackaged by performing verification on the second signature file via the second public key, then verification error message is formed; and Step C3, encrypting the trusted application by using the preset encryption algorithm to obtain a second encrypted value, and comparing the second encrypted value with the first encrypted value to determine whether the first encrypted value is equal to the second encrypted value, and if the result shows "NO", return a verification error message and exit, it will indicate that the trusted application is in a non-security state; and if the result shows "YES", it will indicate that the trusted application is in a security state.

A specific embodiment is described below for illustration:

We suppose that the client application (CA) is tee_demo;

the identification code of the trusted application (TA) is 8aaaf200-2450-11e4-abe2-0002a5d5c51b.ta;

TA UUID is 8aaaf200-2450-11e4-abe2-0002a5d5c51b; and the trusted application is 8aaaf200-2450-11e4-abe2-0002a5d5c51b.ta.

The first public key (RSA root public key) in the first key pair is RSA_ROOT_KEY_PUK, and the first private key (RSA root private key) is RSA_ROOT_KEY_PRI;

The second public key (RSA application public key) in the second key pair is RSA_TA_KEY_PUB, and the second private key (RSA application private key) is RSA_TA_KEY_PRI.

The specific signature implementation process for the trusted application in the operation environment of the upper computer comprises following steps:

Step 1: signing the RSA application public key RSA_TA_KEY_PUB and the universal unique identifier (UUID) 8aaaf200-2450-11e4-abet-0002a5d5c51b of the TA trusted application 8aaaf200-2450-11e4-abe2-0002a5d5c51b.ta by using the RSA root private key RSA_ROOT_KEY_PRI, so as to generate a first signature file RS A_TA_KEY_PUB.sign;

Step 2: calculating the hash of the TA trusted application 8aaaf200-2450-11e4-abet-0002a5d5c51b.ta by using the SHA256 hash algorithm to generate a hash value (the first encrypted value) 8aaaf200-2450-11e4-abet-0002a5d5c51b.hash;

Step 3: signing the 8aaaf200-2450-11e4-abet-0002a5d5c51b.hash by using the RSA application private key RSA_TA_KEY_PRI to generate a second signature file 8aaaf200-2450-11e4-abe2-0002a5d5c51b.hash.sign;

Step 4: packaging the RSA public key RSA_TA_KEY_PUB, the first signature file RSA_TA_KEY_PUB.sign, the TA trusted application 8aaaf200-2450-11e4-abe2-0002a5d5c51b.ta, the hash value 8aaaf200-2450-11e4-abe2-0002a5d5c51b.hash of the TA trusted application and the second signature file 8aaaf200-2450-11e4-abe2-0002a5d5c51b.hash.sign of the hash value, to generate a package file 8aaaf200-2450-11e4-abe2-0002a5d5c51b.pkg.

After the TA signature process is completed, the finally generated signature package file 8aaaf200-2450-11e4-abe2-0002a5d5c51b.pkg is deployed together with the client application to the first operation environment (the REE environment) file system of the first operating system of the device. Afterwards, the RSA root public key RSA_TA_KEY_PUB is burned into the secure storage module (TEE secure storage) corresponding to the security execution system of the intelligent device.

The implementation process for performing a specific verification on a trusted application comprises following steps:

Step 1: The CA client application tee_demo initiates a request from the first operation environment (REE environment), and triggers the secure execution system to load the trusted application and loads 8aaaf200-2450-11e4-abet-0002a5d5c51b.pkg from the REE environment to the second operation environment (TEE security environment); the security execution system (TEE security system) parses 8aaaf200-2450-11e4-abet-0002a5d5c51b.pkg, and obtains the RSA application public key RSA_TA_KEY_PUB, RSA application public key signature RSA_TA_KEY_PUB.sign, TA trusted Application 8aaaf200-2450-11e4-abet-0002a5d5c51b.ta, TA trusted application hash value 8aaaf200-2450-11e4-abe2-0002a5d5c51b.hash and its hash value signature 8aaaf200-2450-11e4-abe2-0002a5d5c51b. hash.sign and so on.

Step 2: Verifying the first signature file RSA_TA_KEY_PUB.sign of the RSA application public key by using the RSA root public key RSA_ROOT_KEY_PUK saved in the secure storage module (TEE security storage). If the verification fails, an error is returned; otherwise, proceeding to Step S3;

Step 3: Verifying the second signature file 8aaaf200-2450-11e4-abet-0002a5d5c51b.hash.sign of the TA trusted application hash value by using the RSA application public key RSA_TA_KEY_PUB. If the verification fails, and error is returned; otherwise, proceeding to Step S4; and Step 4: Calculating the hash value of the TA trusted application 8aaaf200-2450-11e4-abet-0002a5d5c51b.ta to obtain the second encrypted value 8aaaf200-2450-11e4-abet-0002a5d5c51b.hash2, and comparing the second hash value 8aaaf200-2450-11e4-abet-0002a5d5c51b.hash2 with the hash value 8aaaf200-2450-11e4-abet-0002a5d5c51b.hash which is obtained by parsing 8aaaf200-2450-11e4-abet-0002a5d5c51b.pkg, if the result shows that they are different, a verification error is returned; otherwise, the verification is successful, then TA is loaded and is allowed to run normally.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for improving the security of a trusted application, the method is applied to an intelligent device, wherein the intelligent device provides a main operation system and a security execution system;
   wherein an upper computer connected to the intelligent device is provided;
   wherein the main operation system provides a first operation environment, and the security execution system provides a second operation environment;
   wherein a client application is provided, and the client application runs in the first operation environment;
   wherein a trusted application is provided, and the trusted application runs in the second operation environment;
   wherein the method comprises steps of:
      signing the trusted application in a hierarchical signature mode by the upper computer to generate a signature file package about the trusted application, and saving the signature file package in the main operation system;
      obtaining the signature file package from the main operation system and loading the signature file package to the second operation environment by the security execution system;
      parsing the signature file package by the security execution system to obtain a parsed result; and
      performing hierarchical verification on the parsed result by the security execution system, and if the hierarchical verification is passed, it will indicate that the trusted application is in a security state, otherwise, it will indicate that the trusted application is in a non-security state;
   wherein each trusted application comprises a unique identification code;
   wherein a first key pair is provided, the first key pair comprises a first private key and a first public key corresponding to the first private key;
   wherein a second key pair is provided, the second key pair comprises a second private key and a second public key corresponding to the second private key;
   wherein the process of forming the signature file package about the trusted application in the hierarchical signature mode comprises steps of:
      signing the second public key and the identification code of the trusted application via the first key pair to generate a first signature file;
      encrypting the trusted application by using a preset encryption algorithm to obtain a first encrypted value;
      signing the first encrypted value via the second key pair to generate a second signature file; and
      packaging the second public key, the first signature file, the trusted application, the first encrypted value, and the second signature file into the signature file package.

2. The method for improving the security of a trusted application as claimed in claim 1, wherein the encryption algorithm is a hash algorithm, and the first encrypted value is a hash value.

3. The method for improving the security of a trusted application as claimed in claim 1, wherein the identification code is the Universally Unique Identifier (UUID) of the trusted application.

4. The method for improving the security of a trusted application as claimed in claim 1, wherein a public key encryption algorithm is provided, and the first public key and the first private key in the first key pair are obtained by using the public key encryption algorithm, and/or
   the second public key and the second private key in the second key pair are obtained by using the public key encryption algorithm.

5. The method for improving the security of a trusted application as claimed in claim 1, wherein the main operation system is a LINUX system or an Android system, and the first operation environment is an operation environment provided by the LINUX system or the Android system.

6. The method for improving the security of a trusted application as claimed in claim 1, wherein the security execution system is a security operation system, and the second operation environment is an operation environment provided by the security operation system.

7. The method for improving the security of a trusted application as claimed in claim 1, wherein the main operation system provides a storage module, and the storage module is configured to save the signature file package and installation files of the client application;
   wherein the security execution system provides a secure storage module in which the first public key is saved.

8. The method for improving the security of a trusted application as claimed in claim 1, wherein the process of loading the signature file package to the second operation environment comprises steps of:
   transmitting a request for triggering the trusted application to the security execution system by the client application;
   loading the trusted application and the signature file package to the second operation environment according to the request by the security execution system.

9. The method for improving the security of a trusted application as claimed in claim 7, wherein the parsed result obtained by the security execution system parsing the signature file package comprises:

the second public key, the first signature file, the trusted application, the first encrypted value and the second signature file;

wherein the process of performing verification on the parsed result in a hierarchical verification mode by the security execution system comprises steps of:

the security execution system verifying the first signature file by calling the first public key saved in the secure storage module to obtain a first verification result, and determining whether the verification is successful according to the first verification result, and if the verification is unsuccessful, return a verification error message and exit, it will indicate that the trusted application is in a non-security state;

performing verification on the second signature file via the second public key to obtain a second verification result, and determining whether the verification is successful according to the second verification result;

if the verification is unsuccessful, return a verification error message and exit, it will indicate that the trusted application is in a non-security state; and encrypting the trusted application by using the preset encryption algorithm to obtain a second encrypted value, and comparing the second encrypted value with the first encrypted value to determine whether the first encrypted value is equal to the second encrypted value, and if the result shows "NO", return a verification error message and exit, it will indicate that the trusted application is in a non-security state; and if the result shows "YES", it will indicate that the trusted application is in a security state.

* * * * *